March 24, 1942.  A. B. COPELAND  2,277,074

GUIDE FOR SHEARS

Filed April 23, 1940

Alice B. Copeland,
Inventor by Gilbert E. Moody,
atty

Patented Mar. 24, 1942

2,277,074

UNITED STATES PATENT OFFICE 2,277,074

GUIDE FOR SHEARS

Alice B. Copeland, Turlock, Calif.

Application April 23, 1940, Serial No. 331,149

6 Claims. (Cl. 30—233)

This invention relates to a bias cutting guide, particularly adapted to shears.

An important object of the invention is to provide a guide for the bias cutting of cloth and other material and to provide an inexpensive and efficient device of this character. Other objects and advantages of the invention will be apparent during the course of the following description:

In the accompanying drawing, in which like numerals are employed to designate like parts:

Figure 1:
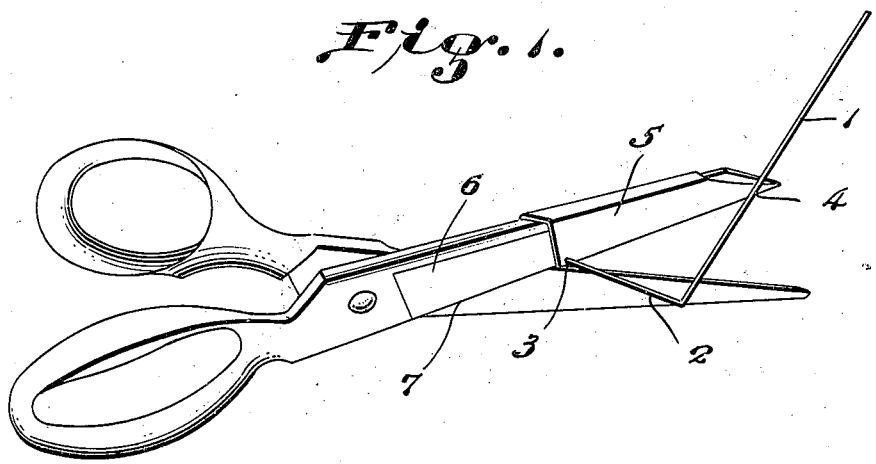
Figure 1 is a perspective view of the guide in conjunction with shears.
Figures 2, 3:
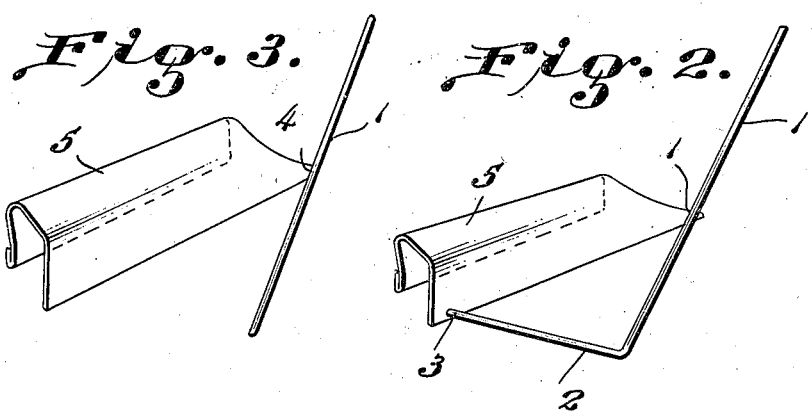
Figure 2 is a perspective view of the guide alone.
Figure 3 is a perspective view of an alternative form of the invention.

In the drawing, wherein for the purpose of illustration is shown preferred embodiments of the invention, numerals 1 and 2 designate the guide bars which in Figures 1 and 2, are formed of a single bar disposed at a right angle and affixed at points 3 and 4 to a mount 5 adapted to slide upon the upper blade 6 of a shears in such manner that the guide bars 1 and 2 are each at an angle of 45 degrees to the plane of the cutting edge 7 of the blade. The mount 5 is preferably formed of a spring metal having sufficient constricting power to hold the guide securely in position when placed upon the upper blade of a shears.

In the alternative form of the invention shown in Figure 3, the guide comprises a single guide bar 1, affixed at point 4 to the mounting member 5.

It is to be understood that the entire guide in the form shown in Figures 1 and 2, may be formed of a single piece of material, and also that the guide bars 1 and 2 or either of them may be permanently affixed to a shears, thus eliminating the mount 5.

In use and operation, the guide is placed upon a shears in the position shown in Figure 1, the guide bars are so disposed upon the piece of material to be cut so that the two guide bars are in line, respectively, with the warp and woof of the material. The shears are then operated to cut the material, and thus the line of cutting will be at a bias to the warp and woof of the material without necessity of marking the material in any way to indicate proper direction of the cutting operation.

It is to be understood that the form of the invention herewith shown and described, is to be taken as a preferred embodiment of the same, and that various changes in the shape, size, and arrangement of parts may be resorted to without departing from the spirit of the invention or the scope of the subjoined claims.

What I claim is:

1. A bias cutting guide for shears comprising a support and a guide bar affixed thereto, substantially as specified.

2. A bias cutting guide for shears comprising a removable mounting clip, and guides affixed thereto.

3. A bias cutting guide for shears comprising a mounting member, and a fixed guide bar disposed at right angles forming guides each disposed at a bias to the cutting edge of a shears.

4. A guide for shears comprising a removable mounting member adapted to be placed upon a shears, a guide bar disposed at right angles affixed thereto, the tangents of the guide bar forming guides to the cutting plane of the shears.

5. A bias cutting guide for shears comprising a removable mounting clip, a guide bar disposed at right angles forming two guides each disposed at a bias to the cutting edge of a shears.

6. A bias cutting guide for shears comprising a removable mounting clip adapted to the upper blade of a shears, a fixed guide bar disposed at right angles forming a guide disposed at a bias to the cutting edge of the shears.

ALICE B. COPELAND.